United States Patent Office 3,102,004
Patented Aug. 27, 1963

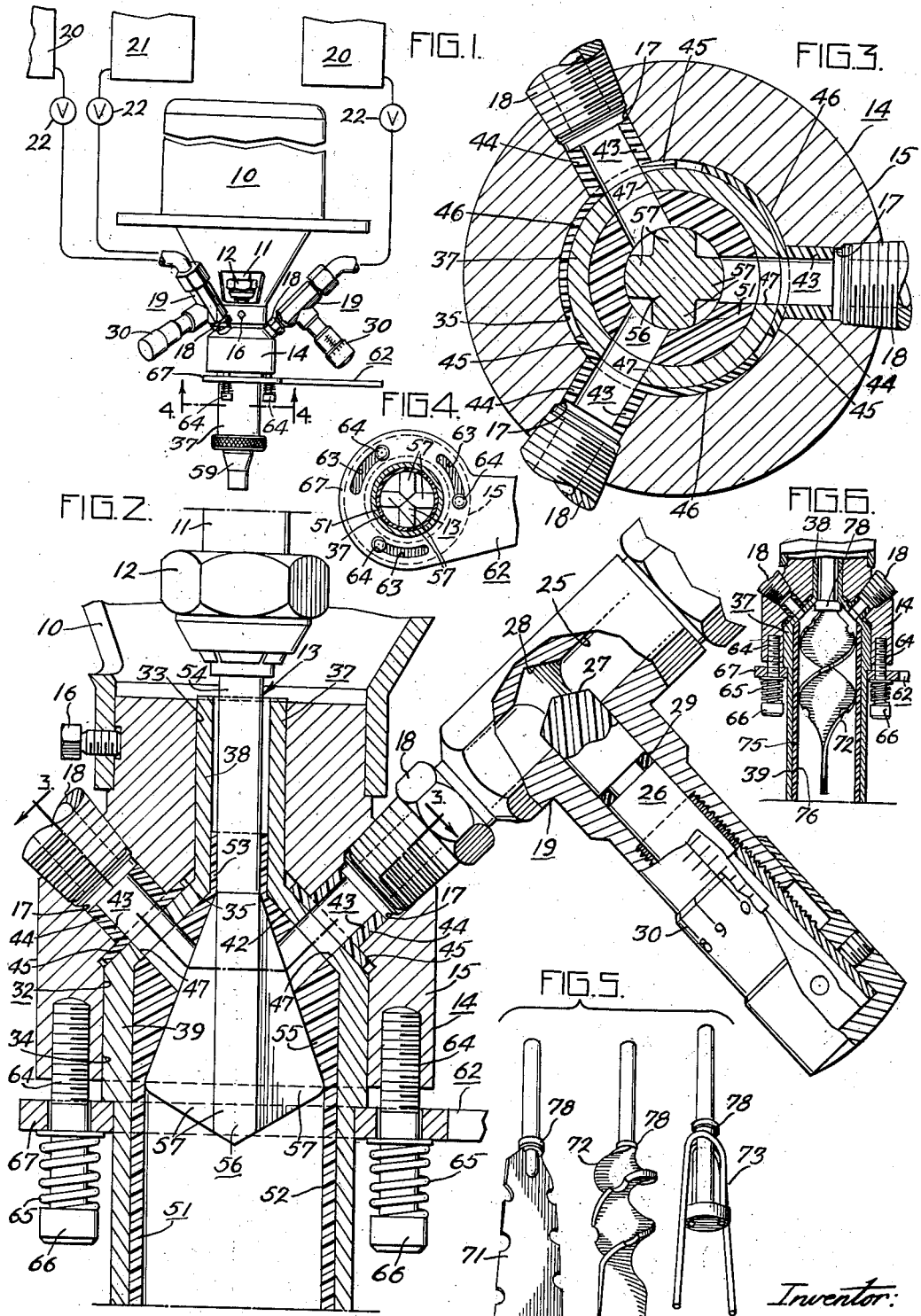

3,102,004
MIXING AND DISPENSING APPARATUS
Joseph John Grintz, Bristol Road, Churchville, Pa.
Filed Aug. 5, 1959, Ser. No. 831,905
8 Claims. (Cl. 23—252)

The present invention relates to apparatus for mixing and dispensing plastic foams and the like, and has particular application to a mixing and dispensing head for urethane plastics in which a plurality of ingredients, for example a urethane resin and a catalyst, are mixed prior to dispensing into a mold or the like.

The present invention provides a novel mixing and dispensing apparatus of extremely simple design which is fully effective in operation and use.

All of the objects of the invention and the various features and details of the construction and operation thereof are more fully set forth hereinafter with reference to the accompanying drawing wherein:

FIG. 1 is a view, partly diagrammatic, illustrating apparatus made in accordance with the present invention;

FIG. 2 is an enlarged fragmentary vertical transverse section through the mixing head of the apparatus shown in FIG. 1;

FIG. 3 is a sectional view taken on the broken section line 3—3 of FIG. 2;

FIG. 4 is a sectional view at an enlarged scale taken on the line 4—4 of FIG. 1;

FIG. 5 is a composite view showing alternate forms of impeller-agitators which may be employed in the apparatus of the present invention;

FIG. 6 is a fragmentary view similar to FIG. 2, but at a reduced scale showing the form of liner used in the head in conjunction with the impeller-agitators shown in FIG. 5.

Referring now to the drawing, the apparatus comprises a casing 10 which encloses the drive motor for the impeller-agitator of the head. The shaft 11 of the motor projects downwardly and terminates in a coupling 12 for attachment to an impeller-agitator 13 mounted for rotation coaxially in the mixing and dispensing head which is indicated generally at 14. The head 14 comprises a head body 15 secured to the casing 10 as indicated at 16 and having a plurality of, in present instance three, inlet passages 17 adapted to receive fittings 18 for introducing the material into the body. Two of the fittings 18 are connected to metering devices 19 which in turn are connected to suitable supply tanks 20. In the present instance one of the supply tanks 20 contains the urethane resin and the other supply tank 20 contains the catalyst. The third supply tank 21 is provided which is connected directly to the third fitting 18 to supply a solvent for flushing the head when operation of the apparatus is interrupted. Shut-off valves 22 are provided in each of the lines leading from the supply tanks to the mixing and dispensing head.

The metering device 19 comprises a straight-through flow gate valve having a straight bore 25 therein. A cylindrical gate element 26 having a diameter slightly greater than the diameter of the bore 25 is mounted for axial movement transversely of the bore 25. The leading end of the gate element 26 is tapered as indicated at 27 and cooperates with a conical seat 28 at the opposite side of the bore in registry therewith. A suitable sealing element is provided at 29 to prevent escape of the material from the bore 25, and a micrometer adjusting mechanism 30 is provided to insure accurate positioning of the cylindrical gate 26. Thus, by accurately positioning the gate element 26 in the path of the material flowing through the bore 25, accurate and precise control of the flow of material from the tanks 20 to the mixing head is achieved, proper flow being assured by pressurizing the contents of the containers 20 in a conventional manner (not shown).

The body 15 of the head is provided with a bore 32 having a reduced neck 33 at its upper end, an enlarged cylindrical portion 34 at its lower end, and a connecting tapered shoulder 35 into which the inlet passages 17 enter. A hollow rotary valve element 37 is fitted in the bore and has a neck portion 38 and a body portion 39 connected to the neck portion 38 by a tapered portion 42. The tapered portion 42 is provided with apertures 47 adapted to register with the passages in the tapered shoulder 35.

The tapered portion 42 of the valve element 37 is spaced from the tapered shoulder 35 of the body 15 to receive therebetween replaceable seat-inserts 43 fitted in the passages 17. As shown in FIGS. 2 and 3, each seat-insert 43 comprises a hollow cylindrical portion 44 adapted to fit snugly within the passage 17 and flange-tabs 45 sealingly engaging between the shoulder 35 and the tapered portion 42. Each tab 45 is provided with an extension 46. Thus when the valve element 37 is in the position shown in full lines in FIG. 3, access from the ports 17 into the interior of the valve element 37 is provided, the flange-tabs sealing the space between the shoulder 35 and the tapered portion 42. Rotation of the valve element 37 counterclockwise as shown in FIG. 3 causes the apertures to pass out of registry with the ports 17. The apertures then bear against the extensions 46 of the flanges 45 to effectively seal the interior of the valve element 37. When the apparatus is in operation, the shut-off valve for the solvent is closed and the shut-off valves for the resin and catalyst are open so that the materials flow through the metering devices 19 into the bore of the valve element 37. When the apparatus is shut down, the supply of the resin and catalyst is interrupted by closing the valves 22 and the solvent is admitted to the unit through the remaining inlet passage 17 from the tank 21, thereby completely flushing the unit wherever there is a possibility of the resin and the catalyst combining.

The valve element 37 is operated by an operating lever 62 secured to the enlarged portion 34 thereof. The lever 62 has an annular flange 67 surrounding the portion 34 and provided with a plurality of, in the present instance three, arcuate slots 63 which receive fasteners 64 secured to the head body 15. The lever 62 serves to mount the valve element 37 within the body 15, and to this end, springs 65 are compressed between the head 66 of the fasteners 64 and the lever 62 to thereby bias the valve element 37 upwardly into firm sealing engagement with the seats 43.

The present invention provides a dispensing head which is readily disassembled for cleaning and repair. To this end, a nozzle portion 59 (see FIG. 1) is threadably engaged with the lower end of the valve element 37 so that it may be readily removed therefrom. The valve element 37 is readily removed from the housing body by releasing the fasteners 64. The agitator 13 is removed by releasing the coupling 12. The fittings 18 are easily removed from the passages 17, and the connection 16 enables ready disengagement of the body 15 from the casing 10. Thus the head is readily disassembled for cleaning or repair and is easily reassembled for subsequent operation.

In the embodiment of the invention illustrated in FIGS. 1 to 4 inclusive, the valve element 37 is provided with a liner 51 having a thin cylindrical shell 52 adjacent its lower end of less length than the body portion 39 of the valve 37. A thin cylindrical shell 53 is provided at the upper end to seal between the neck 38 of the valve element and the shaft 54 of the agitator 13. The shells 53 and 52 are interconnected by a body portion 55 which tapers more gradually than does the tapered portion 42 of the valve element and the tapered shoulder 35 of the housing. The body is ported to register with the apertures 47.

The agitator 13 has a head 56 comprising four radial blades or scraper elements 57 having an outline conforming to the taper of the body 55. The blades 57 therefore scrape the walls of the body 55 as the motor shaft 11 rotates the agitator. This embodiment of the invention is particularly adapted for high speed operation wherein the high centrifugal force set up by the rapidly rotating agitator head 56 causes the materials introduced into the body 55 to flow rapidly down into the lower cylindrical shell 52 and effects forceful discharge of the material through the nozzle 59.

When operating at low speeds, or when handling foams of different consistency, a different form of agitator may be used. For example, FIG. 5 shows agitators 71, 72 and 73 which operate to provide varying degrees of downward pressure on the material within the body of the valve element. The agitator 72 provides a forceful ejection of the material through the nozzle 59 and agitator 71 provides a less forceful ejection whereas the agitator 73 provides an even less forceful ejection. The agitators shown in FIG. 5 are especially adapted for use with a valve element having a liner such as shown in FIG. 6 wherein the liner 75 consists of a single cylindrical shell conforming to the enlarged cylindrical portion 39 of the valve element 37. To provide a seal between the chamber 76 within the shell 75 and the reduced neck portion 38 of the valve, each agitator is provided with an annular sealing element 78 which bears against the lower terminus of the neck 38 and prevents the material from entering the neck.

Preferably the elements 43, 46, 51, 75 and 78 are composed of a material such as Teflon which is non-adherent to the urethane product being mixed in the dispensing head and which effectively serves as a low-friction seal between metal parts.

While particular embodiments of the present invention have been herein illustrated and described, it is not intended to limit the invention to such disclosures, but changes and modifications may be made therein and thereto within the scope of the following claims.

I claim:

1. Apparatus for mixing and dispensing urethane products comprising a dispensing head having a bore therein, a hollow rotary valve element mounted in said bore, a discharge nozzle at one end of said hollow valve connected to the bore thereof, passages in said head, apertures in said hollow rotary valve operable in one position to register with said passages and in another position to pass out of registry with said passages, metering devices connected to at least two of said passages, said metering devices consisting of gate valves having a straight-line bore and a gate operable to intercept the bore of the valve and throttle the flow of material therethrough, shutoff valves controlling the flow of material to said passages, containers containing pressurized ingredients for said urethane product connected to said shut-off valve whereby upon opening of the latter valves and upon registry of said apertures with said passages, said ingredients flow into the interior of said rotary valve element, and an agitator rotatable coaxially within said valve and having a head mounted in said valve operable upon rotation of said agitator to effect a mixture of ingredients in the bore of said hollow rotary valve.

2. Apparatus according to claim 1 including a liner for said hollow valve, said liner having a portion which tapers upwardly and having ports in registry with said valve apertures to direct the ingredients passing through said apertures into the bore of said liner, said agitator having blade means with an outline conforming to the taper of said liner whereby upon rotation of said agitator within said liner, the outer periphery of the blade means of said agitator scrapes the material from said liner and discharges the same from the apparatus.

3. Apparatus according to claim 1 wherein said rotary valve is spaced from said housing adjacent said apertures and ports, and including a valve seat insert having a hollow cylindrical portion adapted to telescopically engage in said passages and flange portions adapted to seal between said valve element and said housing, said flange portion having an extension adapted to seal off said apertures when said rotary valve is displaced to closed position with its apertures out of registery with said passages.

4. Apparatus according to claim 1 wherein said gate of said gate valve is cylindrical in form, and including micrometer adjustment mechanism to displace said cylindrical gate axially to intercept said bore.

5. Apparatus according to claim 1 including a motor releasibly coupled to said agitator to rotate the same, a housing for said motor, means releasably securing said head to said housing, and fittings releasibly interconnecting said metering devices to said passages whereby said agitator may be uncoupled from said motor and said head released from said casing and said metering devices for cleaning and repair.

6. A mixing and dispensing head comprising a head body having a bore consisting of an enlarged and a reduced cylindrical portion connected by a tapering shoulder, passages through said body terminating in said shoulder, a hollow rotary valve element mounted for rotation in said bore coaxially therewith, said valve element having enlarged and reduced cylindrical portions slidable in the corresponding portions of said bore, a tapering portion interconnecting the latter portions and having apertures therein adapted to register with said passengers, said tapering valve and body portions being spaced apart to define a clearance space therebetween, a seat-insert for each passage comprising a cylindrical portion telescopically received in the associated passage and a flange-tab surrounding said telescoping portion and projecting into said clearance space to seal between said tapering portions of said valve and said body, means to rotate said valve to cause said apertures to pass out of registry with said passages, and impeller-agitator means rotatable within said hollow valve to mix the material admitted through said registering passages and aperture and dispense it axially through said enlarged cylindrical portion.

7. Apparatus according to claim 6 including spring means connecting said rotary valve to said head for rotation therein, said spring means biasing said valve element axially to sealingly engage the tapered portion of said element against the flange-tabs of said seat-inserts.

8. A head according to claim 6 wherein said valve has a liner, and said impeller-agitator means includes blades having an outline conforming to said liner and operable upon rotation to scrape the walls of said liner, and including a nozzle mounted on said valve in communication with the bore of said valve element at the end of the enlarged portion remote from said tapered portion.

References Cited in the file of this patent

UNITED STATES PATENTS

| 1,739,428 | Tracy | Dec. 10, 1929 |
| 2,847,196 | Franklin et al. | Aug. 12, 1958 |
| 2,868,518 | Corby et al. | Jan. 13, 1959 |

OTHER REFERENCES

Industrial and Eng. Chem., vol. 42, No. 5, 1950, pages 65A and 66A.